United States Patent
Ichihara et al.

(10) Patent No.: US 7,508,626 B2
(45) Date of Patent: Mar. 24, 2009

(54) THIN FILM MAGNETIC HEAD HAVING MAGNETIC POLE WITH CONTROLLED DIMENSIONS

(75) Inventors: Shigeru Ichihara, Tokyo (JP); Akihiro Oda, Tokyo (JP); Tetsuya Roppongi, Tokyo (JP); Naoto Matono, Saku (JP)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 1302 days.

(21) Appl. No.: 10/720,478

(22) Filed: Nov. 25, 2003

(65) Prior Publication Data

US 2004/0184191 A1    Sep. 23, 2004

(30) Foreign Application Priority Data

Dec. 4, 2002    (JP)   ............................. 2002-352797

(51) Int. Cl.
*G11B 5/187*    (2006.01)

(52) U.S. Cl. ............................. 360/125.06; 360/125.12; 360/125.14

(58) Field of Classification Search ............ 360/125.41, 360/125.43, 125.54, 125.56, 125.06, 125.08, 360/125.1, 125.12, 125.14
See application file for complete search history.

(56) References Cited

U.S. PATENT DOCUMENTS 6,515,824 B1 *   2/2003   Sato ...................... 360/125.44
6,624,971 B1 *   9/2003   Sasaki ................... 360/125.51
6,999,275 B2 *   2/2006   Morita et al. .......... 360/125.45
6,999,276 B2 *   2/2006   Kanada et al. ......... 360/125.54
7,142,392 B2 *   11/2006   Ohtomo et al. ........ 360/125.43

FOREIGN PATENT DOCUMENTS

| JP | A-02-210609 | 8/1990 |
|---|---|---|
| JP | A 5-54320 | 3/1993 |
| JP | B2 6-66188 | 8/1994 |
| JP | B2 2543374 | 7/1996 |
| JP | A-2001-291212 | 10/2001 |
| JP | A-2002-324303 | 11/2002 |

OTHER PUBLICATIONS

Katsuya Yokohoma, "Introduction to Magnetic Recording Technology", Jul. 1998, pp. 7-79, 1st ed., Sougoudenshi Publishing Company.

* cited by examiner

*Primary Examiner*—Jefferson Evans
(74) *Attorney, Agent, or Firm*—Oliff & Berridge, PLC (57) ABSTRACT

The present invention provides a thin film magnetic head in which a magnetic domain structure of a magnetic pole layer is controlled and fluctuation in recording magnetization caused by leaked magnetic flux generated by unintentional shift of a magnetic domain wall can be prevented. When a length of a front end portion of a magnetic pole part layer, which specifies a recording track width of a recording medium, is set as D, and a width of an upper edge of a magnetic pole end surface, positioned on a medium outflow side, is set as W, a dimensional ratio D/W of the length D to the width W is set so as to lie within the range of $0 < D/W \leq 2.3$. Since magnetic domain stability of the magnetic pole part layer is assured on the basis of the proper formation of the shape of the front end portion, leak of magnetic flux from the front end portion immediately after recording is suppressed. Therefore, occurrence of an inconvenience such as unintended erasure of information caused by the leaked magnetic flux is prevented.

4 Claims, 9 Drawing Sheets

THIN FILM MAGNETIC HEAD HAVING MAGNETIC POLE WITH CONTROLLED DIMENSIONS

BACKGROUND OF THE INVENTION

1. Field of the Invention

The present invention relates to a thin film magnetic head having at least an inductive magnetic transducer for recording and, more particularly, to a thin film magnetic head of a perpendicular recording type for magnetizing a recording medium in the direction orthogonal to the surface of the recording medium at the time of recording.

2. Description of the Related Art

In recent years, for example, in the field of development of a magnetic recording medium (hereinbelow, simply called "recording medium") such as a hard disk, recording density is increasing and a magnetization transition region in a recording medium is being narrowed. It accompanies an unintended magnetization inverting phenomenon caused by thermal fluctuation, that is, recording demagnetization is becoming a problem. In place of the conventional "longitudinal recording method", the "perpendicular recording method" is being regarded as a promising method which deals with the problem of recording demagnetization. In the perpendicular recording method, different from the longitudinal recording method in which the orientation of a signal magnetic field is set to an in-plane direction (longitudinal direction) of a recording medium, the orientation of a signal magnetic field is set to a direction orthogonal to the surface of a recording medium. A thin film magnetic head of the perpendicular recording method has, as a part for a recording process, a head (single-pole head) disposed perpendicular to a recording medium.

To realize high-density recording higher than about 100 Gbpsi, the perpendicular recording method is employed as the recording method and, in addition, for example, the following items have to be considered.

First, to assure excellent recording capability for a recording medium having a high coercive force, a material having high saturation magnetic flux density has to be used as the material of a single-pole head. An example of the material having high saturation magnetic flux density is an alloy material introduced in "Slater-Pauling curve" by Bozoroth, concretely, an iron cobalt alloy (FeCo; Fe=30 percent by weight) having the highest saturation magnetic flux density (about 2.45 T (tesla)) in bulk alloys. Although an iron cobalt alloy containing 30 to 50 percent by weight of an iron component has an advantage from the viewpoint of saturation magnetic flux density, magnetostriction is large so that it is difficult to obtain a proper soft magnetic characteristic. There is, consequently, a problem that a desired magnetic domain structure is not easily obtained by the material of a single-pole head.

Second, to assure a stable recording characteristic, as a recording medium to be used in combination with the single-pole head, for example, a recording medium of a two-layered configuration having a stacked-layer structure of a soft magnetic layer and a recording magnetic layer has to be used. In the recording medium of the two-layered configuration, a magnetic flux for recording which is emitted from the single-pole head can be efficiently pulled into the soft magnetic layer by using the soft magnetic layer functioning as a flux path. Although the recording medium of the two-layered configuration has an advantage from the viewpoint of efficiency of pulling the magnetic flux for recording, it also has a problem such that when a magnetic flux is leaked from the single-pole head, recording magnetization of the recording medium is disturbed due to the leaked magnetic flux, and information may be unintentionally erased.

Third, to assure stable recording operation, the magnetic domain structure of the single-pole head has to be controlled. Generally, in a magnetic material, a magnetic domain structure is formed so that the sum of (1) magnetic static energy, (2) other magnetic anisotropic energies including shape magnetic anisotropy, and (3) magnetic domain wall energy becomes the minimum as a whole. If control on the magnetic domain structure of the single-pole head is insufficient, a magnetic flux is unintentionally leaked from the single-pole head due to occurrence of a magnetic domain change (shift of the magnetic domain wall) and it is feared that the recording magnetization of the recording medium is disturbed by the leaked magnetic flux.

Among the three items, particularly, the point of controlling the magnetic domain structure of the simple-pole head is largely related to the unintended magnetic flux leak phenomenon, so that it is important. Examples of a known technique for controlling the magnetic domain structure of the single-pole head are a method of alternately stacking a soft magnetic layer and a nonmagnetic layer (refer to, for example, Japanese Patent Publication No. Hei 6-66188 and Japanese Paten Laid-open No. Hei 5-54320) and a method of alternately stacking a magnetic artificial lattice film and a nonmagnetic insulating film (refer to, for example, Japanese Patent No. 2,543,374).

However, when considering trends that the saturation magnetic flux density of the material of a head is increasing and the recording track width is being narrowed in association with rapid increase in recording density of recent years, in spite of importance of controlling the magnetic domain structure of a single-pole head in order to prevent unintended magnetic flux leak, the above-described existing techniques have a problem that it is difficult to sufficiently properly control the magnetic domain structure of the single-pole head. In particular, if it is intended to prevent the unintentional leak of magnetic flux as much as possible, as described above, it is necessary to control the magnetic domain structure of the single-pole head and, in addition, to properly form the shape of the single-pole head.

SUMMARY OF THE INVENTION

The present invention has been achieved in consideration of such problems and its first object is to provide a thin film magnetic head in which the magnetic domain structure of a magnetic pole layer can be controlled and fluctuation in recording magnetization caused by a leaked magnetic flux generated by unintentional shift of a magnetic domain wall can be prevented.

A second object of the invention is to provide a thin film magnetic head in which the shape of a magnetic pole layer can be properly formed and fluctuation in recording magnetization caused by a leaked magnetic flux generated by unintentional shift of a magnetic domain wall can be prevented.

A thin film magnetic head of the invention comprises: a thin film coil for generating a magnetic flux; and a magnetic pole layer for emitting the magnetic flux generated by the thin film coil toward a recording medium which moves in a predetermined medium traveling direction and for magnetizing the recording medium in a direction orthogonal to the surface of the recording medium. The magnetic pole layer has a magnetic pole end surface exposed in a recording-medium-facing surface which faces the recording medium and includes a track width specifying part specifying a recording track width of the recording medium. When length in the direction orthogonal to the recording-medium-facing surface in the track width specifying part of the magnetic pole layer is set as D and width of a magnetic pole edge positioned on a medium outflow side in the medium traveling direction of the magnetic pole end surface is set as W, a dimensional ratio D/W lies within the range of 0<D/W≦2.3.

In the thin film magnetic head of the invention, the dimensional ratio D/W of the track width specifying part in the magnetic pole layer lies within the range of 0<D/W≦2.3. Consequently, magnetic domain stability in the magnetic pole layer is assured on the basis of proper formation of the shape of the track width specifying part, and leak of magnetic flux from the track width specifying part immediately after recording is suppressed.

In the thin film magnetic head according to the invention, the track width specifying part may be made of an alloy containing iron (Fe) and cobalt (Co) and having a coercive force of less than $5.0 \times 10^3/(4\pi)$ A/m, and the dimensional ratio D/W may be within the range of 0<D/W≦2.8.

In the thin film magnetic head according to the invention, the track width specifying part may be made of an alloy containing iron and cobalt and having a coercive force of $10.0 \times 10^3/(4\pi)$ A/m, and the dimensional ratio DAW may be within the range of 0<D/W≦2.3.

In the thin film magnetic head of the invention, it is particularly effective when the width W of the magnetic pole edge is 0.3 μm or less.

In the thin film magnetic head of the invention, preferably, the magnetic pole layer further includes a wide part coupled to the track width specifying part and having a width larger than the width of the track width specifying part, and when total length of the track width specifying part and the wide part in the magnetic pole layer is set as L1 and the width of the wide part is set as L2, a dimensional ratio L1/L2 lies within the range of 0.25<L1/L2<1.0.

In the thin film magnetic head of the invention, it is more effective when the magnetic pole layer has a stacked-layer structure in which a magnetic layer and a nonmagnetic layer are alternately stacked.

Other and further objects, features and advantages of the invention will appear more fully from the following description.

DETAILED DESCRIPTION OF THE PRFERRED EMBODIMENTS

Embodiments of the invention will be described in detail hereinbelow with reference to the drawings.

First Embodiment

Figure 1A:
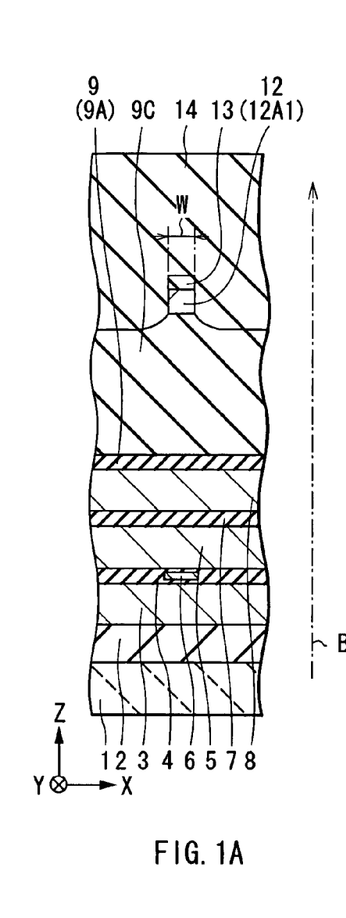
FIGS. 1A and 1B are cross sections showing a sectional configuration of a thin film magnetic head according to a first embodiment of the invention.
Figure 1B:
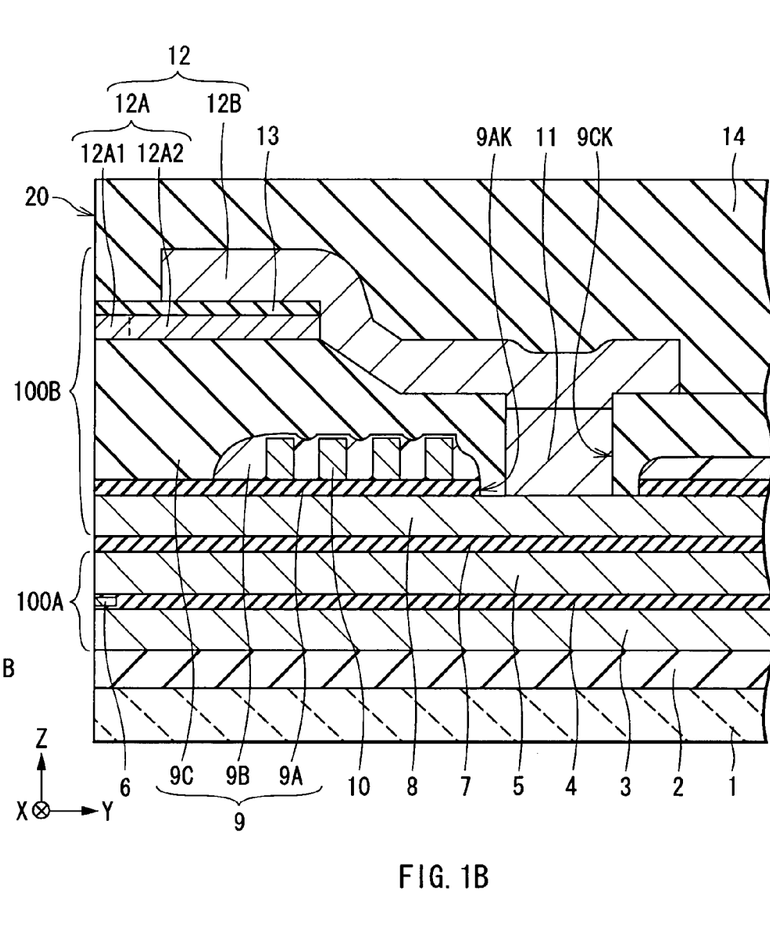

First, the configuration of a thin film magnetic head according to a first embodiment of the invention will be described with reference to FIGS. 1A and 1B. FIGS. 1A and 1B show sectional configurations of a thin film magnetic head. FIG. 1A shows a section parallel to an air bearing surface and FIG. 1B shows a section perpendicular to the air bearing surface. An upward arrow B shown in FIGS. 1A and 1B indicates the direction in which a recording medium (not shown) travels relative to the thin film magnetic head, that is, the traveling direction of a recording medium (medium traveling direction).

In the following description, the distance (or direction) in the X-axis direction shown in FIGS. 1A and 1B will be described as "width (or the width direction)", the distance in the Y-axis direction will be described as "length", and the distance in the Z-axis direction will be described as "thickness". The side closer to the air bearing surface in the Y-axis direction will be described as "front side" and the side opposite to the front side will be described as "rear side". The description will be similarly used in FIG. 2 and subsequent drawings.

The thin film magnetic head is, for example, a composite head capable of executing the functions of both recording and reproducing. As shown in FIGS. 1A and 1B, the thin film magnetic head has a configuration obtained by stacking, on a substrate 1 made of, for example, AlTiC ($Al_2O_3 \cdot TiC$), an insulating layer 2 made of, for example, an aluminum oxide ($Al_2O_3$, hereinbelow, simply called "alumina"), a reproducing head 100A for executing a reproducing process by using a magneto-resistive (MR) effect, a non magnetic layer 7 made of alumina or the like, a recording head 100B of a single magnetic pole type for executing a recording process by the perpendicular recording method, and an overcoat layer 14 made of alumina or the like. The layers are stacked in this order.

The reproducing head 100A has, for example, a configuration in which a lower shield layer 3, a shield gap film 4, and an upper shield layer 5 are stacked in this order. In the shield gap film 4, an MR device 6 as a reproducing device is buried so that one end face is exposed in a recording-medium-facing surface (air bearing surface) 20 which faces a recording medium.

The lower and upper shield layers 3 and 5 are made of, for example, a nickel iron alloy (NiFe (for example, Ni: 80% by weight and Fe: 20% by weight) which will be simply called "permalloy (trademark)" hereinbelow). The shield gap film 4 is made of, for example, alumina. The MR device 6 is provided to execute a reproducing process by using GMR (Giant Magneto-resistance) effect or TMR (Tunneling Magneto-resistance) effect.

The recording head 100B has a configuration obtained by, for example, sequentially stacking a return yoke layer 8, a thin film coil 10 for generating a magnetic flux, which is buried with a gap layer 9 having an opening 9CK, a coupling part 11 magnetically coupled to the return yoke layer 8 through the opening 9CK, and a magnetic pole layer 12 magnetically connected to the return yoke layer 8 via the coupling part 11. The gap layer 9 includes: a gap layer portion 9A disposed on the return yoke layer 8 and having an opening 9AK; a gap layer portion 9B disposed on the gap layer portion 9A so as to cover gaps between turns of the thin film coil 10 and a peripheral area; and a gap layer portion 9C disposed so as to cover the thin film coil 10 together with the gap layer portions 9A and 9B and having the opening 9CK in a position corresponding to the opening 9AK. The magnetic pole layer 12 has a configuration obtained by sequentially stacking, on a front portion of the gap layer portion 9C, a magnetic pole part layer 12A disposed so that its one end surface is exposed in the air bearing surface 20, a buffer layer 13, and a yoke part layer 12B whose one end surface is recessed from the air bearing surface 20 and magnetically coupled to a rear portion of the magnetic pole part layer 12A.

The return yoke layer 8 and the coupling part 11 are made of, for example, permalloy. In the gap layer 9, for example, the gap layer portion 9A is made of alumina, the gap layer portion 9B is made of a photoresist (photosensitive resin) or spin on glass (SOG), and the gap layer portion 9C is made of alumina or a silicon oxide ($SiO_2$). In the magnetic pole layer 12, for example, the magnetic pole part layer 12A and the yoke part layer 12B are made of a material having saturation magnetic flux density Bs of about 2.0 T or higher. The buffer layer 13 is made of nickel copper, a material containing titanium or tantalum, alumina, or silicon oxide. In particular, the magnetic pole part layer 12A is made of a material having saturation magnetic flux density higher than that of the yoke part layer 12B, which is concretely, for example, an alloy containing iron (Fe) and cobalt (Co) (iron cobalt alloy). An example of the iron cobalt alloy is an iron cobalt alloy (FeCo) having saturation magnetic flux density Bs of about 2.3 T or higher.

Figure 2:
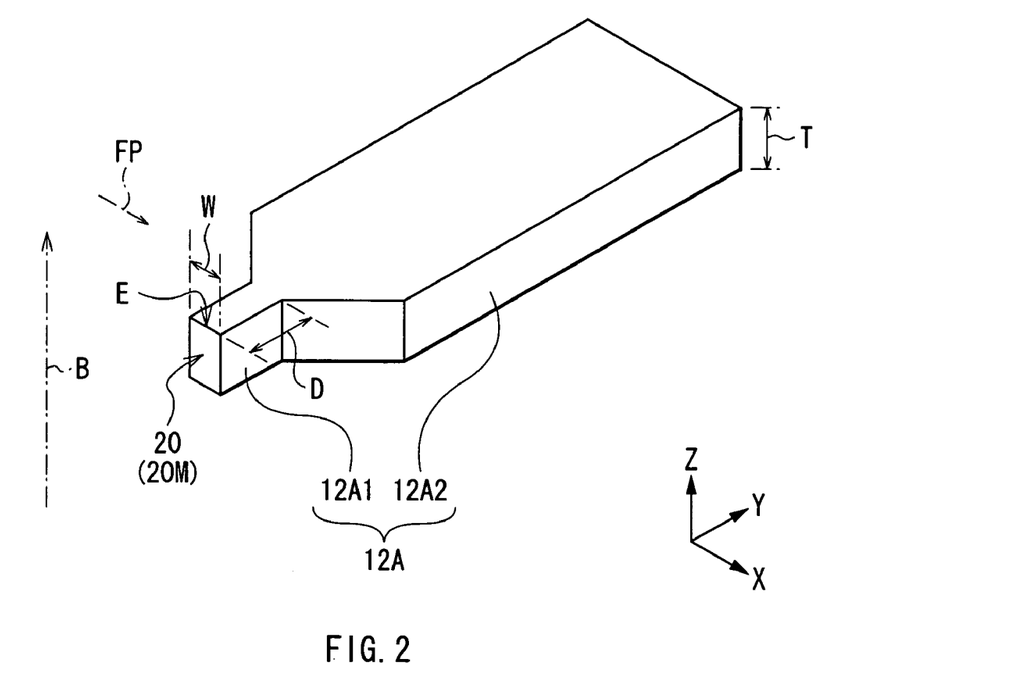
FIG. 2 is an enlarged perspective view showing the configuration of a magnetic pole part layer in the thin film magnetic head shown in FIGS. 1A and 1B.

The detailed configuration of the magnetic pole part layer 12A will now be described with reference to FIG. 2. FIG. 2 is an enlarged perspective view showing the configuration of the magnetic pole part layer 12A illustrated in FIGS. 1A and 1B.

The magnetic pole part layer 12A is used for, mainly, emitting a magnetic flux generated by the thin film coil 10 toward a recording medium and magnetizing a recording medium in the direction orthogonal to the surface of the recording medium. As shown in FIG. 2, the magnetic pole part layer 12A includes, in order from the side close to the air bearing surface 20, a front end portion 12A1 having a uniform width and a rear end portion 12A2 magnetically coupled to the front end portion 12A1. The coupling position between the front end portion 12A1 and the rear end portion 12A2 is a position from which the width of the whole magnetic pole part layer 12A increases, that is, a flare point FP.

The front end portion 12A1 has a uniform width specifying the recording track width of the recording medium, and has a rectangular-shaped magnetic pole end surface 20M exposed in the air bearing surface 20. The magnetic pole end surface 20M has an upper edge (magnetic pole edge) E positioned on a medium outflow side in the traveling direction B of a recording medium. The upper edge E is a part specifying the recording track width, that is, a part in which a recording process is actually performed on a recording medium from the front end portion 12A1. The width W of the upper edge E is, for example, in the range of 0.03 µm≦W≦0.3 µm. The "medium outflow side (or trailing side)" denotes here an outflow side when a movement of a recording medium in the traveling direction B of the recording medium is regarded as a flow. Concretely, the medium outflow side refers to the upper side in the thickness direction (Z axis direction). An inflow side which is opposite to the "medium outflow side", that is, the lower side in the thickness direction is called a "medium inflow side (leading side)".

In particular, the shape of the portion from the air bearing surface 20 to the flare point FP in the magnetic pole part layer 12A, that is, the front end portion 12A1 is properly formed in order to prevent unintended magnetic flux leak. Specifically, when the length of the front end portion 12A1 is D and the width of the upper edge E of the magnetic pole end surface 20M is W, the ratio (dimensional ratio) D/W of the length D to the width W lies within the range of 0<D/W≦2.3. More concretely, the range of the dimensional ratio D/W varies according to the material (coercive force) of the front end portion 12A1. For example, in the case where the front end portion 12A1 is made of an iron cobalt alloy whose coercive force Hc is less than about $5.0\times10^3/(4\pi)$ A/m (5.0 Oe), the dimensional ratio D/W lies within the range of 0<D/W≦2.8. In the case where the front end portion 12A1 is made of an iron cobalt alloy whose coercive force Hc is about $10.0\times10^3/(4\pi)$ A/m (10.0 Oe), the dimensional ratio D/W lies within the range of 0<D/WA≦2.3.

The front end portion 12A1 may be made of not necessarily the material having the specific coercive force value but may be made of an iron cobalt alloy having another coercive force value as long as it has a proper soft magnetic characteristic of the coercive force Hc of about $10.0\times10^3/(4\pi)$ A/m or less. The front end portion 12A1 may be made of other iron cobalt base alloys different from the above-described iron cobalt alloys. The "other iron cobalt base alloys" include, for example, a cobalt nickel iron alloy (CoNiFe having saturation magnetic flux density Bs of about 1.8 T to 2.0 T and coercive force Hc of less than about $5.0\times10^3/(4\pi)$ A/m (=5.0 Oe)) having saturation magnetic flux density lower than that of an iron cobalt alloy, and an iron cobalt zirconium alloy oxide (FeCoZrO having saturation magnetic flux density Bs of about 2.0 T to 2.3 T and coercive force Hc of about $5.0\times10^3/(4\pi)$ A/m (=5.0 Oe)). The front end portion 12A1 corresponds to a concrete example of "track width specifying portion" in the invention.

The rear end portion 12A2 is wider than the front end portion 12A1. Concretely, for example, the rear end portion 12A2 has a uniform width larger than the width of the front end portion 12A1 in a rear portion and is narrowed toward the front end portion 12A1 in a front portion. The rear end portion 12A2 corresponds to a concrete example of "wide portion" in the invention.

The operation of the thin film magnetic head will now be described with reference to FIGS. 1A and 1B and FIG. 2.

In the thin film magnetic head, in an information recording operation, when a current flows into the thin film coil 10 of the recording head 100B from a not-shown external circuit, a magnetic flux is generated by the thin film coil 10. The magnetic flux is held mainly by the yoke part layer 12B in the magnetic pole layer 12. The magnetic flux held in the yoke part layer 12B flows in the magnetic pole layer 12 from the yoke part layer 12B to the magnetic pole part layer 12A and is emitted to the outside from the front end portion 12A1 of the magnetic pole part layer 12A. On the basis of the emitted magnetic flux, a signal magnetic field for recording (perpendicular magnetic field) is generated. Based on the perpendicular magnetic field, the recording medium is magnetized in the direction orthogonal to the surface, thereby magnetically recording information onto the recording medium.

On the other hand, in an information reproducing operation, when a sense current flows into the MR device 6 of the reproducing head 100A, the resistance value of the MR device 6 changes according to a signal magnetic field for reproducing from the recording medium. By detecting the resistance change as a change in the sense current, information recorded on the recording medium is magnetically read out.

In the thin film magnetic head according to the embodiment, the dimensional ratio D/W regarding the front end portion 12A1 of the magnetic pole part layer 12A is set within the range of $0<D/W\leq2.3$. Consequently, the shape of the front end portion 12A1 can be formed properly and occurrence of an inconvenience caused by unintentional leaked magnetic flux can be prevented.

Specifically, when the magnetic pole part layer 12A of the recording head 100B records information onto a recording medium, generally, a magnetic action (perpendicular magnetic field) is applied from the magnetic pole part layer 12A to a recording medium. Simultaneously, a magnetic action (external magnetic field) is applied from the recording medium to the magnetic pole part layer 12A as a reaction, and the magnetic pole part layer 12A is influenced by the external magnetic field. In this case, there is the possibility that, depending on the influence of the external magnetic field applied to the magnetic pole part layer 12A, a magnetic flux is leaked from the front end portion 12A1 immediately after recording and information is unintentionally erased by the leaked magnetic flux. With respect to this point, in the embodiment, the dimensional ratio D/W of the front end portion 12A1 is set to be within the range of $0<D/W\leq2.3$, and the shape of the front end portion 12A1 is formed properly from the viewpoint of preventing unintentional magnetic flux leak. Thus, the magnetic domain stability of the magnetic pole part layer 12A is assured and leak of the magnetic flux from the front end portion 12A1 is suppressed immediately after recording. The magnetic domain stability is expressed by magnetic resistance of the magnetic pole part layer 12A immediately after recording, that is, the maximum value of an external magnetic field which does not cause magnetization inversion (that is, erasure of information) of medium magnetization (magnetization recorded as information in the recording medium) caused by the leaked magnetic flux. Therefore, in the embodiment, by proper formation of the shape of the front end portion 12A1, fluctuation in the recording magnetization caused by leaked magnetic flux generated by unintentional shift of the magnetic domain wall is prevented, so that occurrence of an inconvenience such as unintended erasure of information is prevented.

In the embodiment, as long as occurrence of an inconvenience caused by unintended leaked magnetic flux can be prevented by setting the dimensional ratio D/W of the front end portion 12A1 to be within the range of $0<D/W\leq2.3$ and properly forming the shape of the front end portion 12A1, the configuration of the thin film magnetic head can be freely changed.

Figure 3:
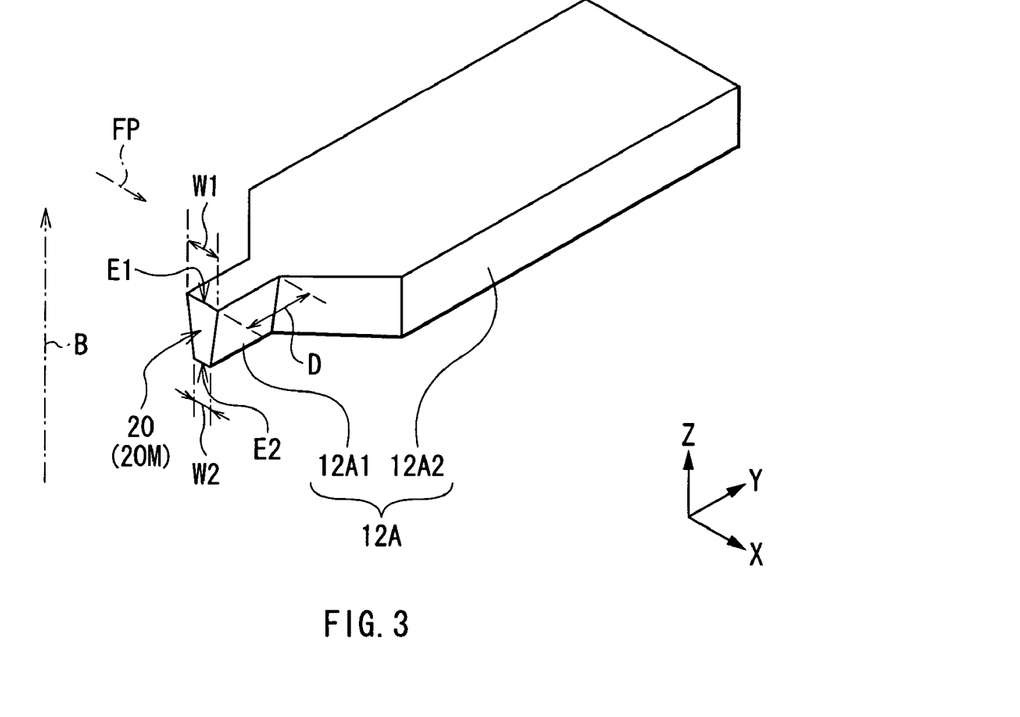
FIG. 3 is a perspective view showing a modification of the configuration of the magnetic pole part layer.

Concretely, in the embodiment, the front end portion 12A1 is set to have the uniform width W as shown in FIG. 2. The invention is not always limited to the configuration. For example, as shown in FIG. 3, the front end portion 12A1 may be gradually narrowed from the medium outflow side (upper side in the diagram) to the medium inflow side (lower side in the diagram). In this case, the magnetic pole end surface 20M has an inverted trapezoid including the upper edge E1 having the width W1 and the lower edge E2 having the width W2 smaller than the width W1 (W2<W1). In this case as well, by properly setting the dimensional ratio D/W1 of the front end portion 12A1 on the basis of the width W1 of the upper edge E1 irrespective of the width W2 of the lower edge E2, effects similar to those of the foregoing embodiment can be obtained.

Figure 4A:
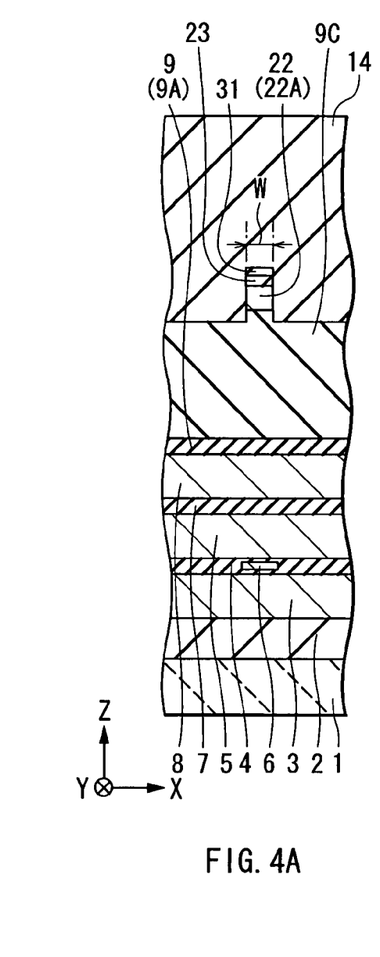
FIGS. 4A and 4B are cross sections showing a sectional configuration of a thin film magnetic head as a modification of the thin film magnetic head according to the first embodiment of the invention.
Figure 4B:
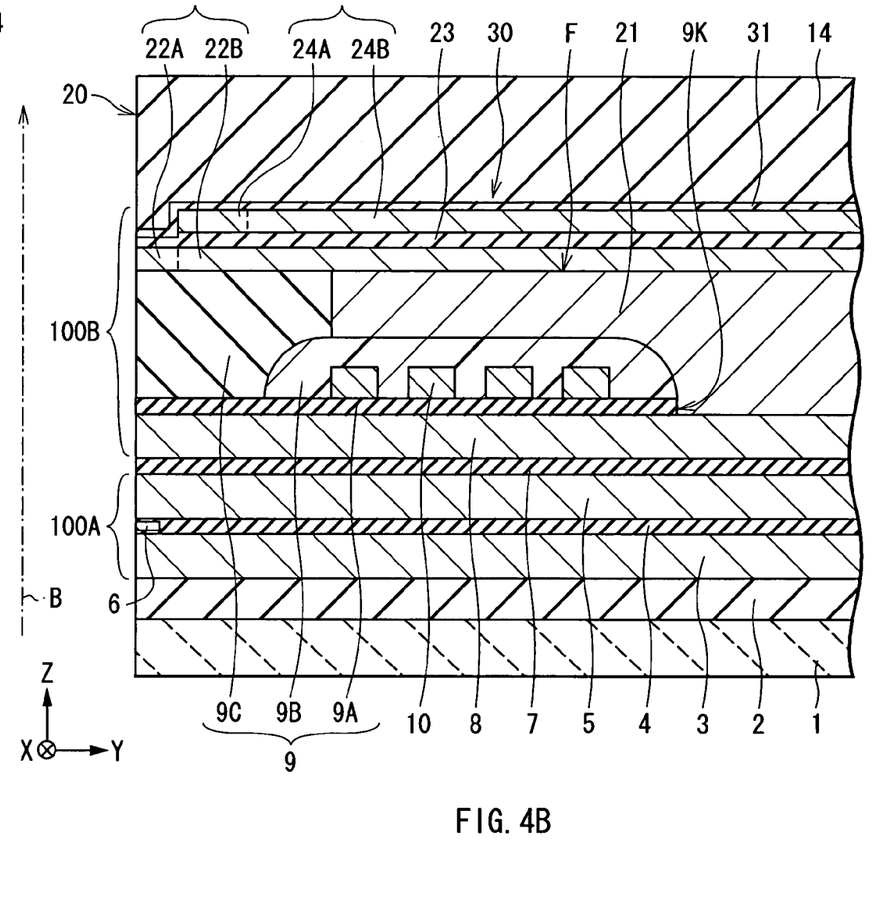
Figure 5:
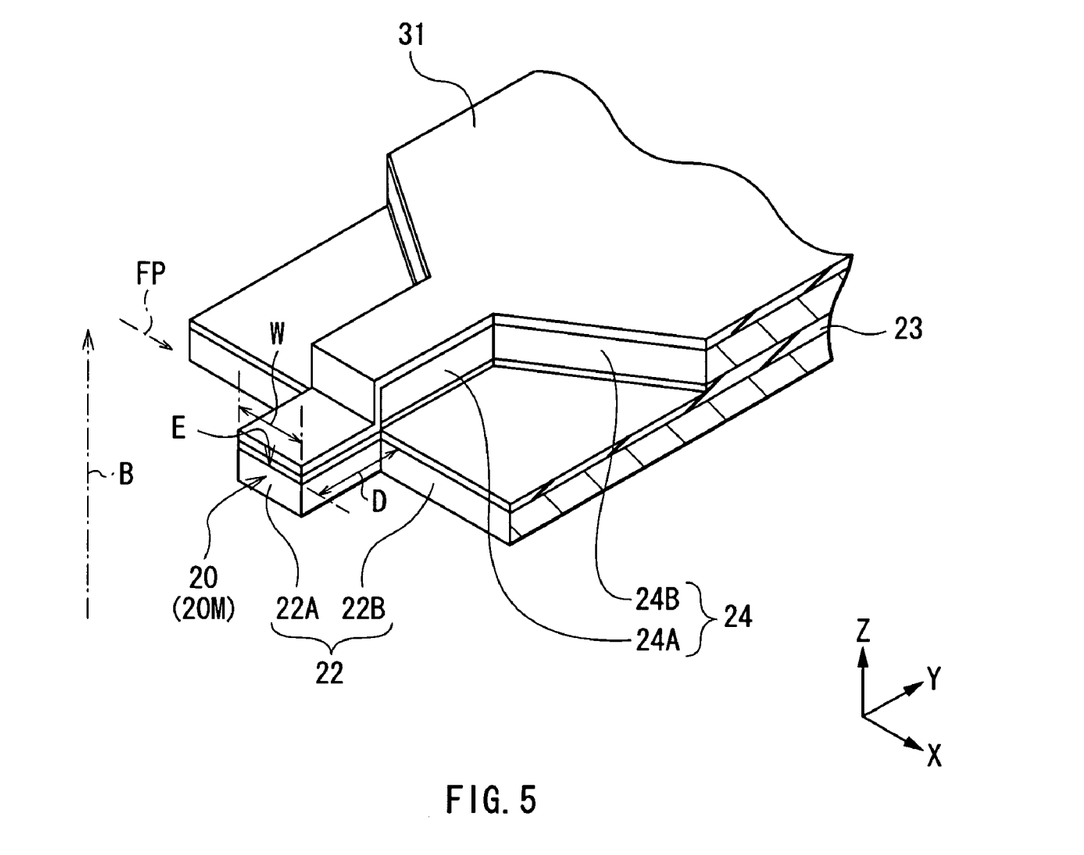
FIG. 5 is an enlarged perspective view showing the configuration of a magnetic pole part layer in the thin film magnetic head shown in FIGS. 4A and 4B.

In the embodiment, in place of the head structure shown in FIGS. 1A and 1B, for example, a head structure show in FIGS. 4A and 4B may be employed. A thin film magnetic head shown in FIGS. 4A and 4B has a configuration similar to that of the thin film magnetic head (refer to FIGS. 1A and 1B) described in the foregoing embodiment except that the head has: (1) in place of the coupling part 11, a yoke layer 21 which constructs a flat surface F together with the gap layer portion 9C; (2) in place of the magnetic pole layer 12 in which the magnetic pole part layer 12A, buffer layer 13, and yoke part layer 12B are stacked in this order, a magnetic pole layer 30 in which a main magnetic pole layer 22, a nonmagnetic layer 23, and an auxiliary magnetic pole layer 24 are stacked in this order; and (3) a buffer layer 31 disposed on the magnetic pole layer 30. The magnetic pole layer 30 is constructed in such a manner that, as shown in FIG. 5, the main magnetic pole layer 22 includes a front end portion 22A having the uniform width W in correspondence with the front end portion 12A1, and a rear end portion 22B having a width larger than that of the front end portion 22A in correspondence with the rear end portion 12A2. The auxiliary magnetic pole layer 24 includes, in order from the position from which the width of the magnetic pole layer 30 increases (the coupling position between the front end portion 22A and the rear end portion 22B), that is, the flare point FP, a front end portion 24A having the same uniform width W as that of the front end portion 22A and a rear end portion 24B having a width larger than the width of the front end portion 24A. The nonmagnetic layer 23 has the same plane shape as that of the main magnetic pole layer 22. The buffer layer 31 has a plane shape corresponding to a member obtained by combining the front end portions 22A and 24A and the rear end portion 24B. Also in the case where the head has the head structure of this kind, by properly setting the dimensional ratio D/W of the portion from the air bearing surface 20 to the flare point FP, that is, the front end portion 22A in the main magnetic pole layer 22, effects similar to those of the foregoing embodiment can be obtained.

Figure 6A:
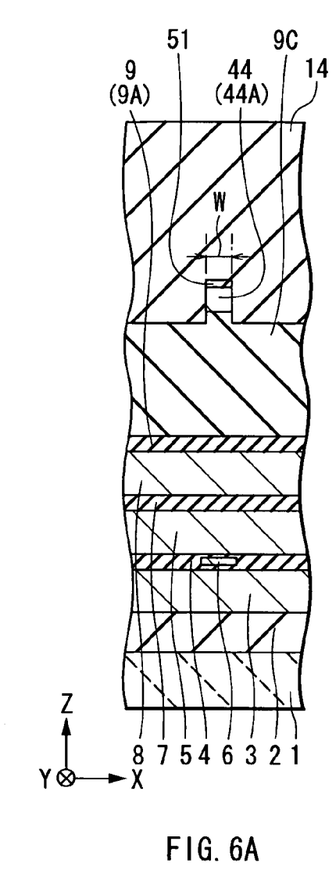
FIGS. 6A and 6B are cross sections showing a sectional configuration of a thin film magnetic head as another modification of the thin film magnetic head according to the first embodiment of the invention.
Figure 6B:
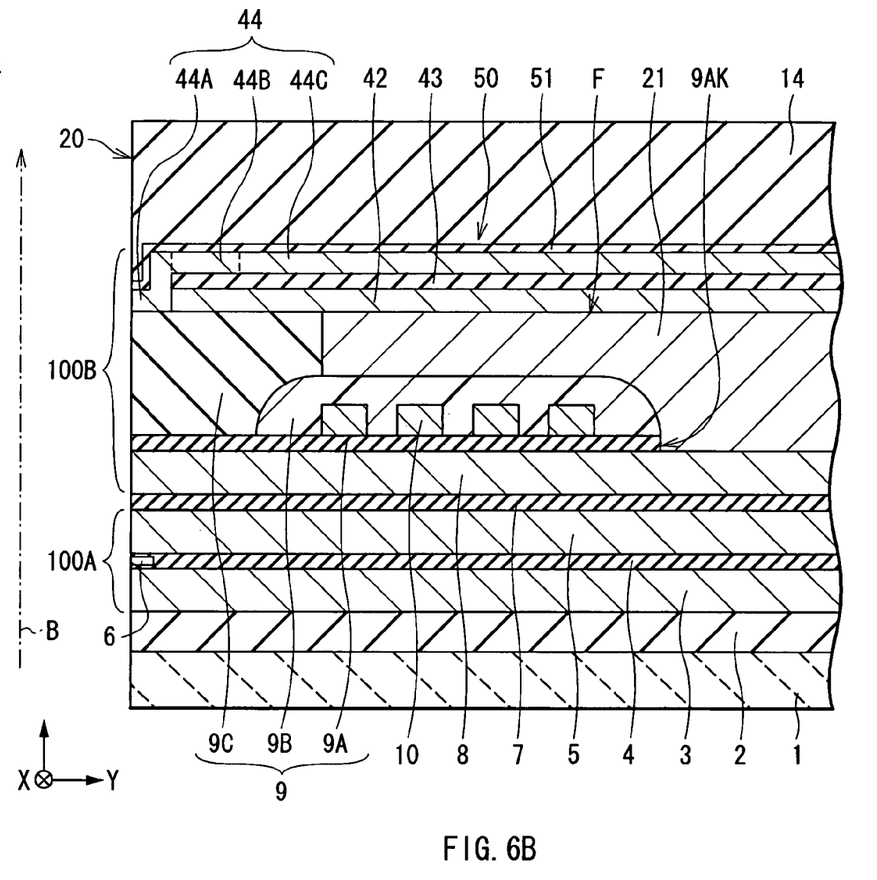
Figure 7:
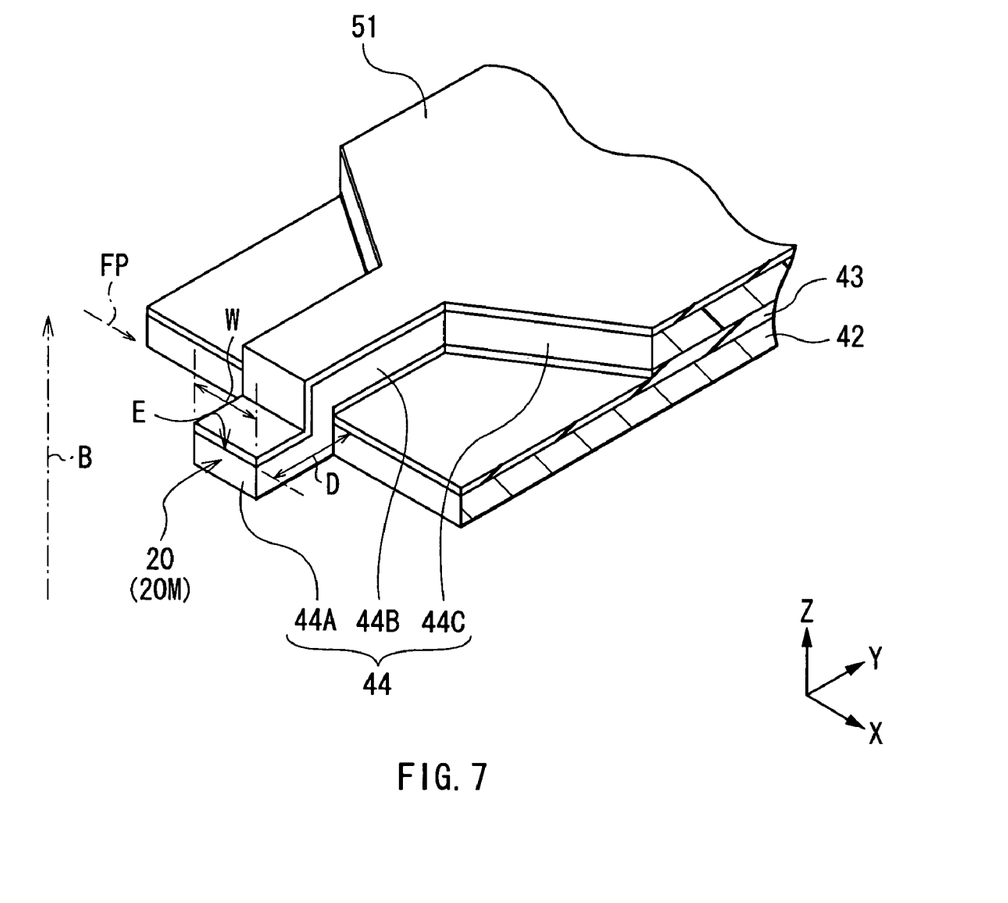
FIG. 7 is an enlarged perspective view showing the configuration of a magnetic pole part layer in the thin film magnetic head shown in FIGS. 6A and 6B.

Further, in the embodiment, in place of the head structures shown in FIGS. 1A and 1B and FIGS. 4A and 4B, for example, a head structure shown in FIGS. 6A and 6B may be employed. The thin film magnetic head shown in FIGS. 6A and 6B has a configuration similar to that of the thin film magnetic head shown in FIGS. 4A and 4B except for the point that a magnetic pole layer 50 in which an auxiliary magnetic pole layer 42, a nonmagnetic layer 43, and a main magnetic pole layer 44 are stacked in this order is provided in place of the magnetic pole layer 30 in which the main magnetic pole layer 22, nonmagnetic layer 23, and auxiliary magnetic pole layer 24 are stacked in this order. The magnetic pole layer 50 is constructed in such a manner that, as shown in FIG. 7, the auxiliary magnetic pole layer 42 has a plane shape corresponding to the rear end portion 22B, and the main magnetic pole layer 44 includes a front end portion 44A having the uniform width W in correspondence with the front end portion 22A, an intermediate portion 44B having the same uniform width W as that of the front end portion 44A in correspondence with the front end portion 24A, and a rear end portion 44C which is wider than the front end portion 44A and the intermediate portion 44B in correspondence with the rear end portion 24B. In the magnetic pole layer 50, the flare point FP is specified on the basis of the coupling position of the front end portion 44A of the main magnetic pole layer 44 and the auxiliary magnetic pole layer 42. The nonmagnetic layer 43 has the same plane shape as that of the auxiliary magnetic pole layer 42. A buffer layer 51 has the same plane shape as that of the main magnetic pole layer 44. Also in the case where the head has the head structure of this kind, by properly setting the dimensional ratio D/W of the portion from the air bearing surface 20 to the flare point FP, that is, the front end portion 44A in the main magnetic pole layer 44, effects similar to those of the foregoing embodiment can be obtained.

Second Embodiment

A second embodiment of the invention will now be described.

In a thin film magnetic head according to the second embodiment, to prevent unintended magnetic flux leak, in addition to the "proper formation of the shape of the front end portion 12A1" described in the foregoing first embodiment, the shape of the whole magnetic pole part layer 12A is formed properly, thereby controlling the magnetic domain structure of the magnetic pole part layer 12A.

Figure 8:
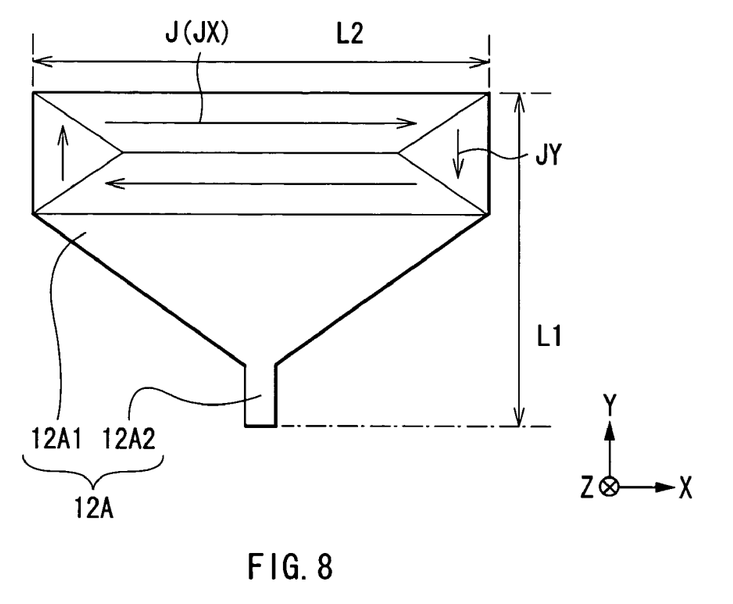
FIG. 8 is an enlarged plan view showing the configuration of a magnetic pole part layer in a thin film magnetic head according to a second embodiment of the invention.

FIG. 8 is an enlarged plan view showing the configuration of the magnetic pole part layer 12A. The magnetic pole part layer 12A has, as shown in FIG. 8, a wide shape in which width is larger than length. Specifically, when the length of the whole magnetic pole part layer 12A (that is, the total length of the front and rear end portions 12A1 and 12A2) is set as L1 and the width of the whole magnetic pole part layer 12A (that is, the width of the rear end portion 12A2) is set as L2, the dimensional ratio L1/L2 of the length L1 to the width L2 lies within the range of 0<L1/L2<1.0. The dimensional ratio L1/L2 is, preferably, in the range of 0.25<L1/L2<1.0 in consideration of assurance of the intensity of the perpendicular magnetic field necessary to stably execute the recording operation.

In the thin film magnetic head according to the embodiment, the shape of the front end portion 12A1 is formed properly as described in the foregoing first embodiment and, further, the dimensional ratio L1/L2 regarding the magnetic pole layer 12A is set within the range of 0.25<L1/L2<1.0. Consequently, for the following reasons, as compared with the first embodiment in which only the shape of the front end portion 12A1 is formed properly, occurrence of an inconvenience caused by unintended leaked magnetic flux can be prevented more effectively.

Figure 9:
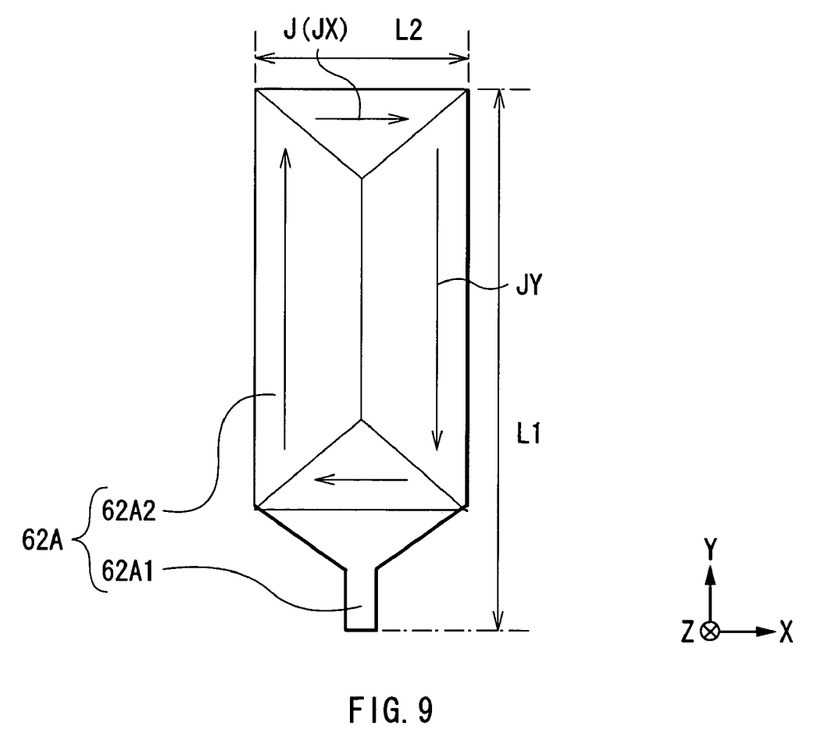
FIG. 9 is a plan view showing a comparative example of the configuration of the magnetic pole part layer.

FIG. 9 is an enlarged plan view showing the configuration of a magnetic pole part layer 62A as a comparative example of the magnetic pole part layer 12A. The magnetic pole part layer 62A includes a front end portion 62A1 and a rear end portion 62A2 corresponding to the front end portion 12A1 and the rear end portion 12A2 of the magnetic pole part layer 12A, respectively, and the dimensional ratio L1/L2 is equal to or higher than 1 (L1/L2≧1.0). In the magnetic pole part layer 62A, as shown in FIG. 9, in a main reflux magnetic domain which exerts a large influence on decision of a whole magnetic domain structure, magnetization J is oriented in correspondence with the elongated shape of the magnetic pole part layer 62A. In this case, the ratio of occupation of the reflux magnetic domain structure of magnetization JY oriented in the length direction (Y-axis direction) is higher than that of magnetization JX oriented in the width direction (X-axis direction), and the magnetic pole part layer 62A as a whole is magnetized toward the air bearing surface 20. Consequently, leak of the magnetic flux easily occurs immediately after recording.

In contrast, in the magnetic pole part layer 12A of the embodiment, as shown in FIG. 8, in the main reflux magnetic domain structure, the magnetization J is oriented in correspondence with the wide shape of the magnetic pole part layer 12A. In this case, different from the comparative example, the ratio of occupation of the reflux magnetic domain structure, of the magnetization JX oriented in the width direction is higher than that of the magnetization JY oriented in the length direction, so that the magnetic pole part layer 12A as a whole is magnetized in the direction parallel to the air bearing surface 20. Consequently, leak of the magnetic flux immediately after recording is suppressed. Therefore, the shape of the front end portion 12A1 is properly formed and, moreover, the magnetic domain structure is controlled on the basis of proper formation of the shape of the whole magnetic pole part layer 12A. Thus, as compared with the first embodiment in which only the shape of the front end portion 12A1 is formed properly, occurrence of an inconvenience caused by unintended leaked magnetic flux can be prevented more effectively.

Since the configuration, action, effects, and modification other than the feature part of the thin film magnetic head according to the second embodiment are similar to those of the first embodiment, their description will not be repeated.

Third Embodiment

A third embodiment of the invention will now be described.

In a thin film magnetic head according to the third embodiment, to prevent unintended magnetic flux leak, in addition to the "proper formation of the shape of the front end portion 12A1" described in the foregoing first embodiment, the magnetic pole part layer 12A is constructed so as to have a stacked structure, thereby controlling the magnetic domain structure of the magnetic pole part layer 12A.

Figure 10:
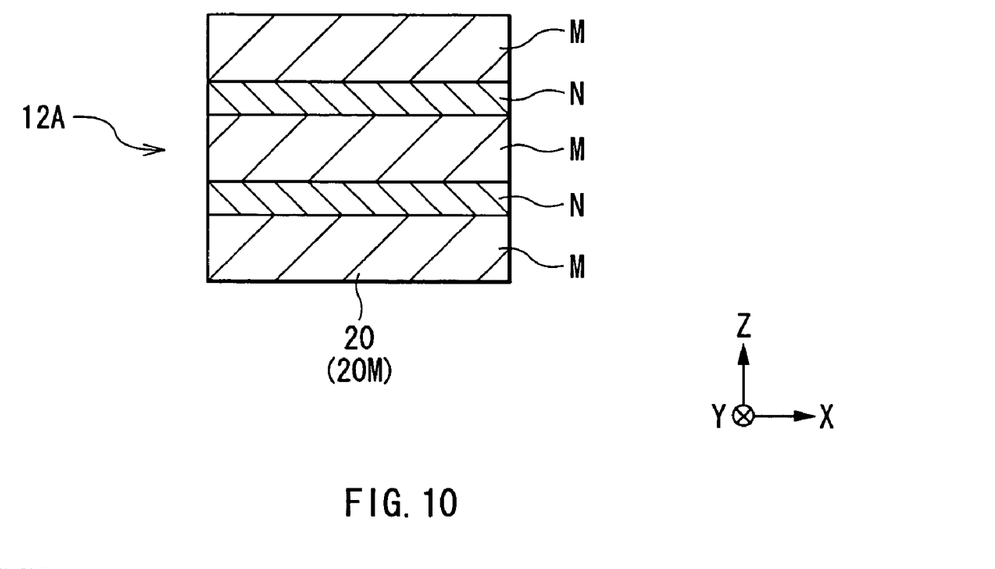
FIG. 10 is an enlarged cross section showing a sectional configuration of a magnetic pole end surface of a magnetic pole part layer in a thin film magnetic head according to a third embodiment of the invention.

FIG. 10 is an enlarged cross section showing the configuration of the magnetic pole end surface 20M of the magnetic pole part layer 12A. The magnetic pole part layer 12A has, as shown in FIG. 10, a stacked structure in which a magnetic layer M made of a material having high saturation magnetic flux density such as an iron cobalt alloy and a nonmagnetic layer N made of a nonmagnetic material such as chromium (Cr) are alternately stacked. FIG. 10 shows, as an example, the case of a stacked structure of total five layers consisting of three magnetic layers M and two nonmagnetic layers N.

In the thin film magnetic head according to the embodiment, the shape of the front end portion 12A1 is formed properly as described in the foregoing first embodiment and, further, the magnetic pole part layer 12A is constructed so as to have a stacked structure in which the magnetic layer M and the nonmagnetic layer N are alternately stacked. Consequently, in the magnetic pole part layer 12A having the stacked layer structure, a magnetic static mutual action occurs between the magnetic layers M, and the magnetic domain wall energy decreases. According to the decrease in the magnetic domain wall energy, the magnetic domain wall dissipates, and the magnetic pole part layer 12A comes to have a single magnetic domain. Therefore, the magnetic domain structure is controlled on the basis of the stacked layer structure of the magnetic pole part layer 12A and leak of the magnetic flux immediately after recording is suppressed. Thus, as compared with the first embodiment in which only the shape of the front end portion 12A1 is formed properly, occurrence of an inconvenience caused by unintended leaked magnetic flux can be prevented more effectively.

Since the configuration, action, effects, and modification other than the feature part of the thin film magnetic head according to the third embodiment are similar to those of the first embodiment, their description will not be repeated.

Fourth Embodiment

A fourth embodiment of the invention will now be described.

In a thin film magnetic head according to the fourth embodiment, to prevent unintended magnetic flux leak, in addition to the "proper formation of the shape of the front end portion 12A1" described in the foregoing first embodiment, all of "proper formation of the shape of the whole magnetic pole part layer 12A" described in the second embodiment, and "stacked layer structure of the magnetic pole part layer 12A" described in the third embodiment are applied. Specifically, in the thin film magnetic head, the magnetic pole part layer 12A is constructed in such a manner that (1) the dimensional ratio D/W of the front end portion 12A1 lies in the range of 0<D/W≦2.3 (refer to FIG. 2), (2) the dimensional ratio L1/L2 of the magnetic pole part layer 12A lies in the range of 0.25<L1/L2 <1.0 (refer to FIG. 8), and (3) the stacked structure in which the magnetic layer M and the nonmagnetic layer N are alternately stacked (refer to FIG. 10).

In the thin film magnetic head according to the embodiment, in addition to "proper formation of the shape of the front end portion 12A1" described in the foregoing first embodiment, both of "proper formation of the shape of the whole magnetic pole part layer 12A" described in the second embodiment and "the stacked structure of the magnetic pole part layer 12A" described in the third embodiment are applied. Consequently, as compared with the second embodiment in which "proper formation of the shape of the front end portion 12A1" and "proper formation of the shape of the whole magnetic pole part layer 12A" are applied and the third embodiment in which "proper formation of the shape of the front end portion 12A1" and "stacked structure of the magnetic pole part layer 12A" are applied, leak of magnetic flux immediately after recording is suppressed more. Therefore, occurrence of an inconvenience caused by unintended leaked magnetic flux can be prevented conspicuously.

Since a modification of the thin film magnetic head according to the fourth embodiment is similar to that of the first embodiment, its description will not be repeated.

Although the invention has been described by some embodiments, the invention is not limited to the embodiments but can be variously modified. Concretely, for example, in the series of the foregoing embodiments, the case of applying the invention to the composite thin film magnetic head having both the reproducing head 100A and the recording head 100B has been described. The invention, however, is not limited to the composite thin film magnetic head but can be also applied to a recording-only thin film magnetic head having only the recording head 100B and a thin film magnetic head having a reproducing/recording head capable of executing both reproducing process and recording process. The invention can be also applied to a thin film magnetic head having a structure in which the order of stacking the reproducing head 100A and the recording head 100B is inverted.

EXAMPLE

An example of the invention will now be described. Some experiments regarding prevention of magnetic flux leak were conducted with respect to the thin film magnetic head of the invention and the following results were obtained.

Figure 11:
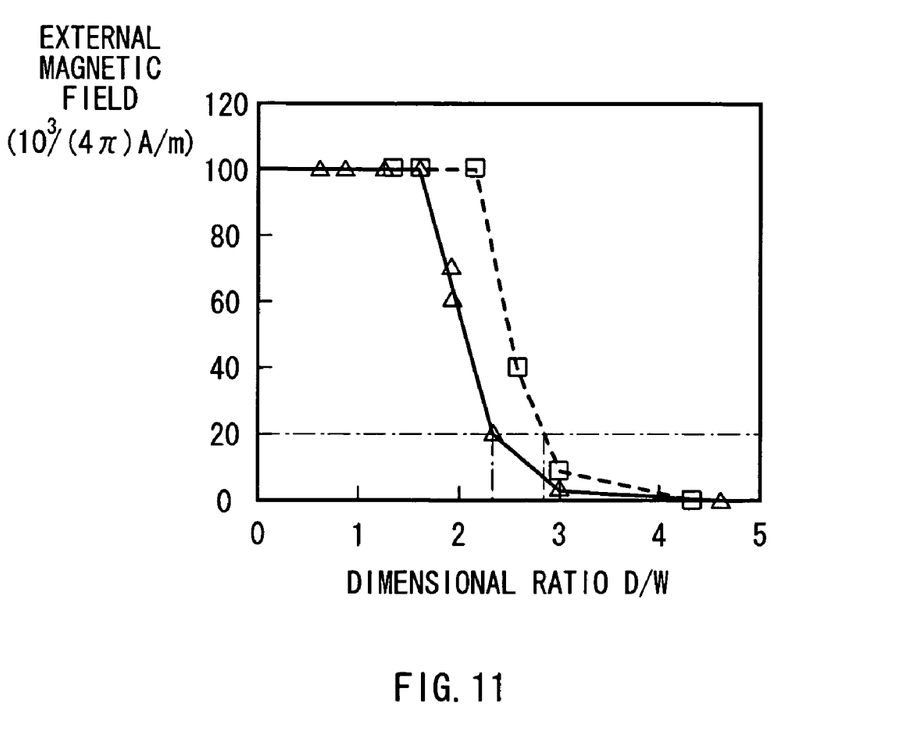
FIG. 11 is a diagram for explaining stability of a magnetic domain of a magnetic pole part layer in the thin film magnetic head according to the first embodiment of the invention.

Dependency on shape of the front end portion 12A1 described in the first embodiment was examined and the result shown in FIG. 11 was obtained. FIG. 11 is a graph for explaining stability of a magnetic domain of the magnetic pole part layer 12A. The horizontal axis in the graph denotes the dimensional ratio D/W of the front end portion 12A1, and the vertical axis indicates an external magnetic field $(10^3/(4\pi))$ A/m (=Oe) as an index for evaluating the magnetic domain stability. "Δ (solid line)" shown in FIG. 11 indicates the case where the front end portion 12A1 is made of an iron cobalt alloy having a coercive force Hc of about $10.0\times10^3/(4\pi)$ A/m (=10.0 Oe). "□ (broken line)" expresses the case where the front end portion 12A1 is made of an iron cobalt alloy having a coercive force Hc of less than about $5.0\times10^3/(4\pi)$ A/m (=5.0 Oe).

For examination of the magnetic domain stability, the thickness T of the magnetic pole part layer 12A was set to 0.3 μm and the width W of the upper edge E was set to W≦0.3 μm (refer to FIG. 2). The magnetic domain stability was evaluated as the following procedure. Information was recorded on a predetermined track (track to be recorded) on a recording medium by using the thin film magnetic head of the invention and, subsequently, was re-recorded in a predetermined location in the track to be recorded, for example, over 100 times at frequencies different from each other while changing the intensity of application of an external magnetic field. After that, a change between a reproducing output in the initial recording on the track to be recorded and a reproducing output immediately after the re-recording was examined.

As understood from FIG. 11, the external magnetic field indicative of the magnetic domain stability increases as the dimensional ratio D/W decreases. In particular, the external magnetic field sharply increases when the dimensional ratio D/W becomes smaller than about 3, and increases to about $100\times10^3/(4\pi)$ A/m when the dimensional ratio D/W becomes smaller than about 2. When it is assumed that the magnetic domain stability required for actual use of the thin film magnetic head (the maximum value of the external magnetic field) is about $20.0\times10^3/(4\pi)$ A/m, in the case (Δ) where the front end portion 12A1 is made of the iron cobalt alloy having the coercive force Hc of about $10.0\times10^3/(4\pi)$ A/m, desired magnetic domain stability is obtained when the dimensional ratio D/W lies in the range of 0<D/W≦2.3. On the other hand, in the case (□) where the front end portion 12A1 is made of the iron cobalt alloy having the coercive force Hc of less than about $5.0\times10^3/(4\pi)$ A/m, desired magnetic domain stability was obtained when the dimensional ratio D/W was in the range of 0<D/W≦2.8. From the above, it was confirmed that when the dimensional ratio D/W is in the range of 0<D/W≦2.3, desired magnetic domain stability is obtained in both of the front end portion 12A1 made of the iron cobalt alloy having the coercive force Hc of about $10.0\times10^3/(4\pi)$ A/m and the front end portion 12A1 made of the iron cobalt alloy having the coercive force Hc of less than about $5.0\times10^3/(4\pi)$ A/m.

Changes in the magnetic domain structure based on formation of the stacked layer structure of the magnetic pole part layer 12A described in the third embodiment were examined and results shown in FIG. 12 were obtained. FIG. 12 schematically shows changes in the magnetic domain structure of the magnetic pole part layer 12A observed by using an MFM (Magnetic Force Microscope).

Figure 12A:
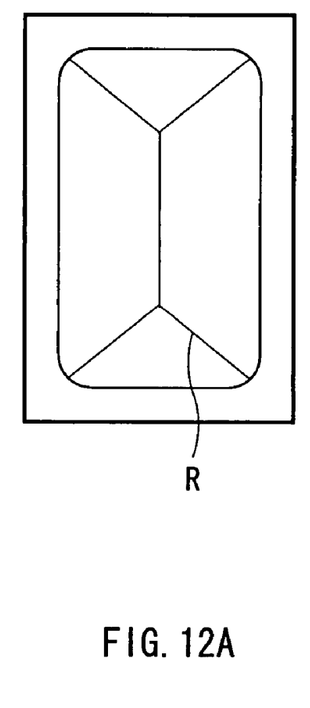
FIGS. 12A to 12D are diagrams schematically showing a change in the magnetic domain structure of the magnetic pole part layer in the thin film magnetic head according to the third embodiment of the invention.
Figure 12B:
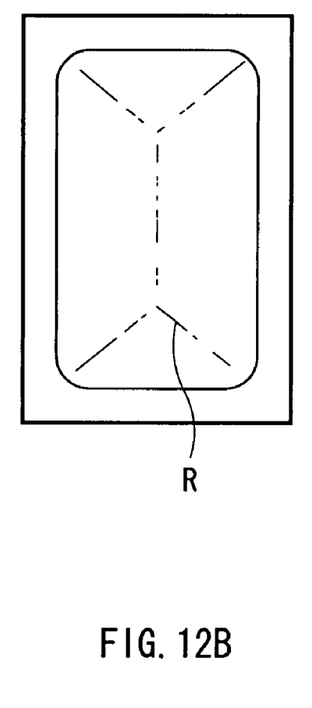
Figure 12C:
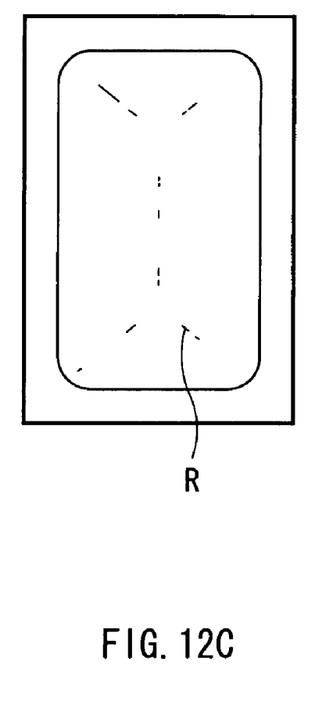
Figure 12D:
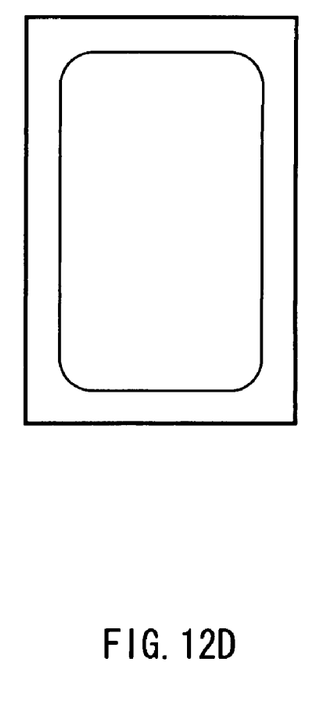

At the time of observing the magnetic domain structure of the magnetic pole part layer 12A, the iron cobalt alloy having the coercive force Hc of about $10.0\times10^3/(4\pi)$ A/m was used as the material of the magnetic layer M, chromium was used as the material of the nonmagnetic layer N, and a stacked-layer structure including the magnetic layers M and the nonmagnetic layers N was pattern in squares each of 5.0 µm×2.5 µm. While fixing the thickness of the nonmagnetic layer N to 5.0 nm, the thickness of each of the magnetic layers M was varied to 0.3 µm, 0.1 µm, 0.06 µm, and 0.03 µm so that the total thickness of the magnetic layer M becomes 0.3 µm. FIG. 12A shows the case where the thickness of the magnetic layer M is 0.3 µm, that is, the number of the magnetic layers M=1, and the number of the nonmagnetic layers N=1. FIG. 12B shows the case where the thickness of the magnetic layer M is 0.1 µm, that is, the number of the magnetic layers M=3, and the number of the nonmagnetic layers N=2. FIG. 12C shows the case where the thickness of the magnetic layer M is 0.06 µm, that is, the number of the magnetic layers M=5, and the number of the nonmagnetic layers N=4. FIG. 12D shows the case where the thickness of the magnetic layer M is 0.03 µm, that is, the number of the magnetic layers M=10, and the number of the nonmagnetic layers N=9.

As understood from the results shown in FIGS. 12A to 12D, in the case where the magnetic layer M is a single layer, as the magnetic domain structure in the magnetic pole part layer 12, a reflux magnetic domain structure having a magnetic domain wall R was clearly obtained (FIG. 12A). As the number of magnetic layers M increased to 3 and 5, the magnetic domain wall R became gradually unclear (FIGS. 12B and 12C). In particular, when the number of magnetic layers M became 10, the magnetic domain wall R disappeared and a single magnetic domain was obtained (FIG. 12D).

As described above, in the thin film magnetic head of the invention, the dimensional ratio D/W of the track width specifying part of the magnetic pole layer is set to be within the range of $0<D/W\leq 2.3$. Consequently, magnetic domain stability in the magnetic pole layer is assured on the basis of proper formation of the shape of the track width specifying part, and leak of magnetic flux from the track width specifying part immediately after recording is suppressed. Therefore, fluctuation in the recording magnetization caused by leaked magnetic flux can be prevented and occurrence of an inconvenience such as unintended erasure of information can be prevented.

In the thin film magnetic head according to the invention, the dimensional ratio L1/L2 of the magnetic pole layer is set to be within the range of $0.25<L1/L2<1.0$, so that the magnetic domain structure of the magnetic pole layer is controlled so that magnetization in the direction parallel to the recording-medium-facing surface is facilitated as a whole on the basis of the proper formation of the shape of the magnetic pole layer, that is, magnetization toward the recording-medium-facing surface is not easily performed. In this case, different from the case where the magnetic pole layer has an elongated shape characteristic ($L1/L2\geq 1.0$), leak of magnetic flux from the magnetic pole layer immediately after recording is suppressed. Therefore, by properly forming the shape of the track width specifying part and, in addition, setting the dimensional ratio L1/L2 of the magnetic pole layer to be within the range, as compared with the case of properly forming the shape of the track width specifying part, occurrence of an inconvenience caused by unintended leaked magnetic flux can be prevented more effectively.

In the thin film magnetic head of the invention, the magnetic pole layer is constructed so as to have a stacked-layer structure in which a magnetic layer and a nonmagnetic layer are alternately stacked. Based on the stacked-layer structure, the magnetic pole layer comes to have a single magnetic domain and leak of magnetic flux from the magnetic pole layer immediately after recording can be suppressed. Therefore, by properly forming the shape of the track width specifying part and, further, constructing the magnetic pole layer to have the stacked-layer structure, as compared with the case of properly forming the shape of the track width specifying part, occurrence of an inconvenience caused by unintended leaked magnetic flux can be prevented more effectively. In particular, by applying, in addition to proper formation of the shape of the track width specifying part, both of proper formation of the shape of the whole magnetic pole layer and the stacked-layer structure of the magnetic pole layer to the thin film magnetic head of the invention, occurrence of an inconvenience caused by unintended leaked magnetic flux can be prevented conspicuously.

Obviously many modifications and variations of the present invention are possible in the light of the above teachings. It is therefore to be understood that within the scope of the appended claims, the invention may be practiced otherwise than as specifically described.

What is claimed is:

1. A thin film magnetic head comprising:
a thin film coil for generating a magnetic flux; and
a magnetic pole layer for emitting the magnetic flux generated by the thin film coil toward a recording medium which moves in a predetermined medium traveling direction and for magnetizing the recording medium in a direction orthogonal to the surface of the recording medium,
the magnetic pole layer having a magnetic pole end surface exposed in a recording-medium-facing surface which faces the recording medium and including a track width specifying part specifying a recording track width of the recording medium,
wherein when length in the direction orthogonal to the recording-medium-facing surface in the track width specifying part of the magnetic pole layer is set as D and width of a magnetic pole edge positioned on a medium outflow side in the medium traveling direction of the magnetic pole end surface is set as W, a dimensional ratio D/W lies within the range of $0<D/W\leq 2.3$,
wherein the track width specifying part is made of an alloy containing iron (Fe) and cobalt (Co) and having a coercive force of less than $5.0\times 10^3/(4\pi)$ A/m,
wherein the width W of the magnetic pole edge is 0.3 µm or less,
wherein the magnetic pole layer further includes a wide part coupled to the track width specifying part and having a width larger than the width of the track width specifying part, and
when total length of the track width specifying part and the wide part in the magnetic pole layer is set as L1 and the width of the wide part is set as L2, a dimensional ratio L1/L2 lies within the range of $0.25<L1/L2<1.0$.

2. A thin film magnetic head according to claim 1, wherein the magnetic pole layer has a stacked-layer structure in which a magnetic layer and a nonmagnetic layer are alternately stacked.

3. A thin film magnetic head comprising:
a thin film coil for generating a magnetic flux; and
a magnetic pole layer for emitting the magnetic flux generated by the thin film coil toward a recording medium which moves in a predetermined medium traveling direction and for magnetizing the recording medium in a direction orthogonal to the surface of the recording medium,
the magnetic pole layer having a magnetic pole end surface exposed in a recording-medium-facing surface which faces the recording medium and including a track width specifying part specifying a recording track width of the recording medium, wherein when length in the direction orthogonal to the recording-medium-facing surface in the track width specifying part of the magnetic pole layer is set as D and width of a magnetic pole edge positioned on a medium outflow side in the medium traveling direction of the magnetic pole end surface is set as W, a dimensional ratio D/W lies within the range of $0 < D/W \leq 2.3$, wherein the track width specifying part is made of an alloy containing iron and cobalt and having a coercive force of $10.0 \times 10^3/(4\pi)$ A/m, wherein the width W of the magnetic pole edge is 0.3 μm or less, wherein the magnetic pole layer further includes a wide part coupled to the track width specifying part and having a width larger than the width of the track width specifying part, and when total length of the track width specifying part and the wide part in the magnetic pole layer is set as L1 and the width of the wide part is set as L2, a dimensional ratio L1/L2 lies within the range of $0.25 < L1/L2 < 1.0$.

4. A thin film magnetic head according to claim 3, wherein the magnetic pole layer has a stacked-layer structure in which a magnetic layer and a nonmagnetic layer are alternately stacked.

* * * * *